H. K. HESS.
PROCESS OF RECOVERING COPPER FROM ITS ORES.
APPLICATION FILED AUG. 27, 1907. RENEWED JUNE 23, 1911.

1,014,061.

Patented Jan. 9, 1912.

3 SHEETS—SHEET 1.

Witnesses.
Inventor.
H. K. Hess,
By Howard P. Denison
Attorney.

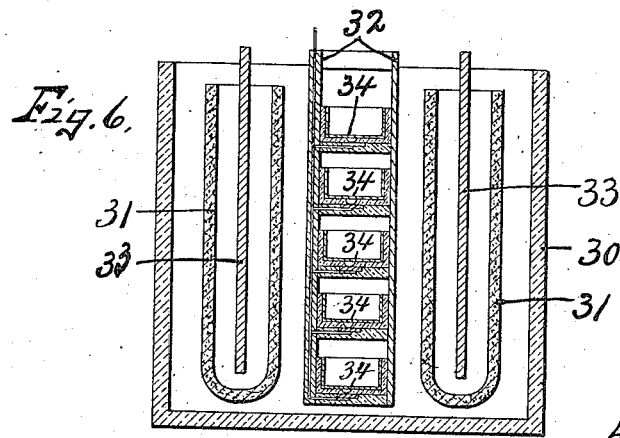
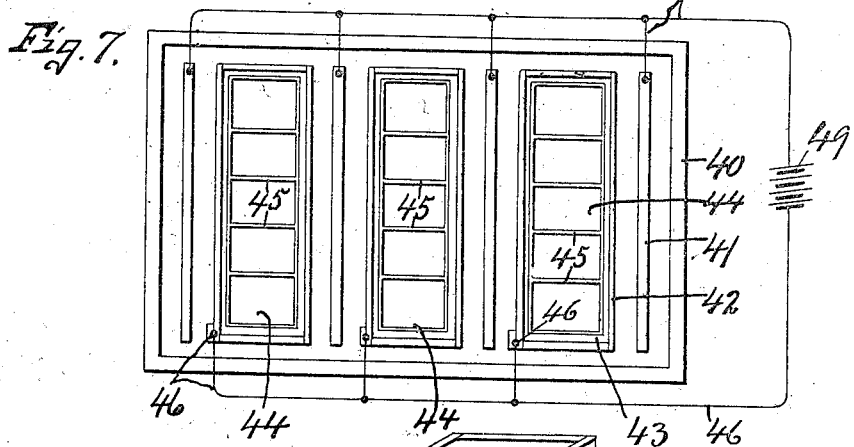
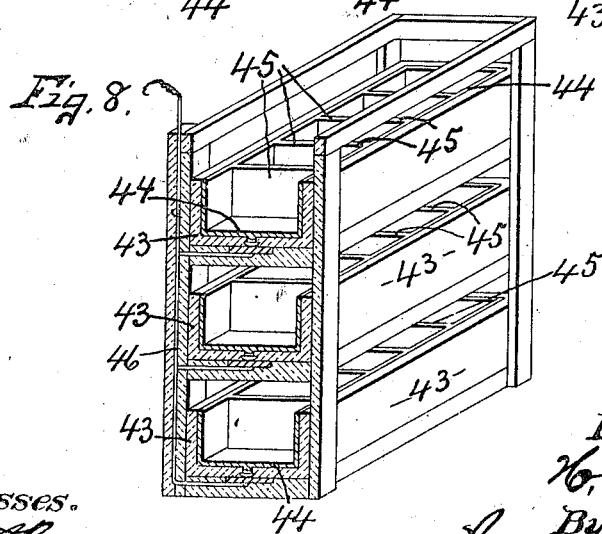

UNITED STATES PATENT OFFICE.

HENRY K. HESS, OF PHILADELPHIA, PENNSYLVANIA, ASSIGNOR TO AMERICAN COPPER EXTRACTING AND REFINING COMPANY, A CORPORATION OF ARIZONA TERRITORY.

PROCESS OF RECOVERING COPPER FROM ITS ORES.

1,014,061.      Specification of Letters Patent.      Patented Jan. 9, 1912.

Application filed August 27, 1907, Serial No. 390,371. Renewed June 23, 1911. Serial No. 635,017.

*To all whom it may concern:*

Be it known that I, HENRY K. HESS, of Philadelphia, in the county of Philadelphia, in the State of Pennsylvania, have invented a new and useful Process for Recovering Copper from Its Ores, of which the following, taken in connection with the accompanying drawings, is a full, clear, and exact description.

This invention relates to an improved method of recovering copper from its ores, and refers more particularly to the specific copper-solvents and to the manner of employing the same for liberating and collecting the copper from the residual constituents of the ore.

My main object is to utilize chromium compounds such as chromic acid as a copper-solvent for extracting the copper from the ores. In other words, I have sought to produce a rapid and economic dissolution of the copper by subjecting the copper-ore to the action of chromic acid which is a powerful solvent and when brought into contact with copper readily dissolves the copper and forms sulfates of copper and sulfate of chromium.

A further object is to subject the copper solution to the action of an electric current in the presence of suitable electrodes. I have here shown a multi-compartment cell having one or more porous partitions, whereby copper is caused to be liberated at the negative electrode or cathode, while chromic acid is simultaneously regenerated at the positive electrode or anode but I do not confine myself to any specific arrangement of cells or electrodes.

Other objects and uses will appear in the following description.

Figure 1:
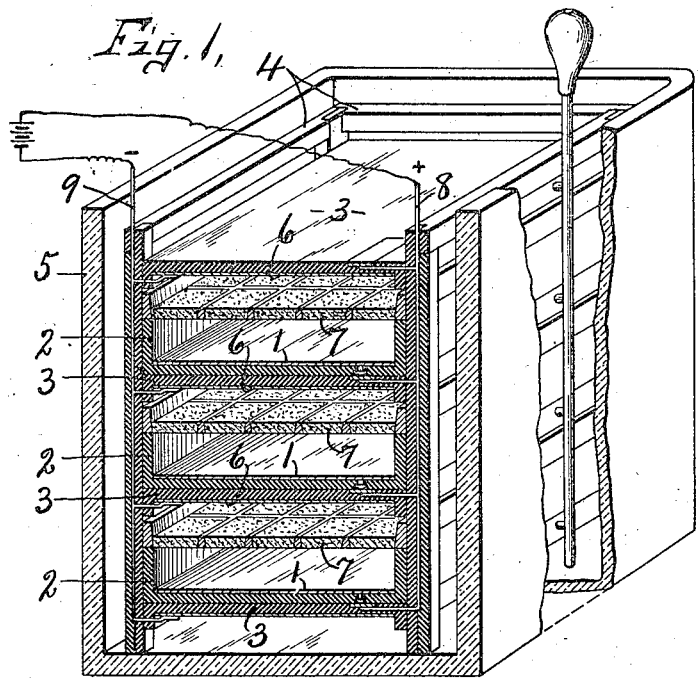
Figure 2:
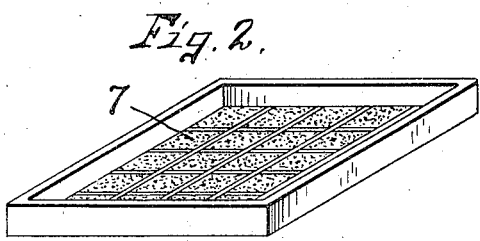
Figure 3:
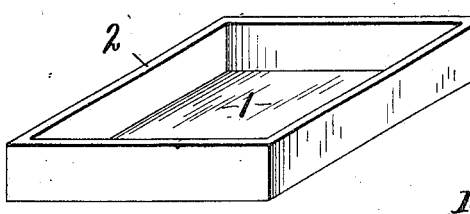
Figure 4:
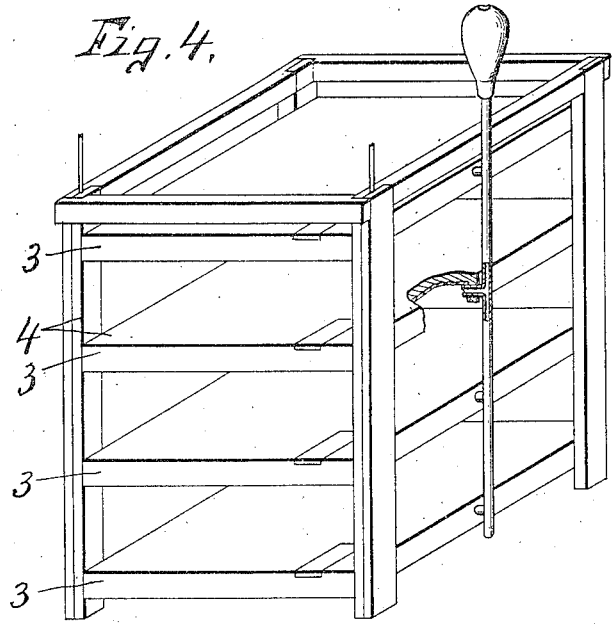
Figure 5:
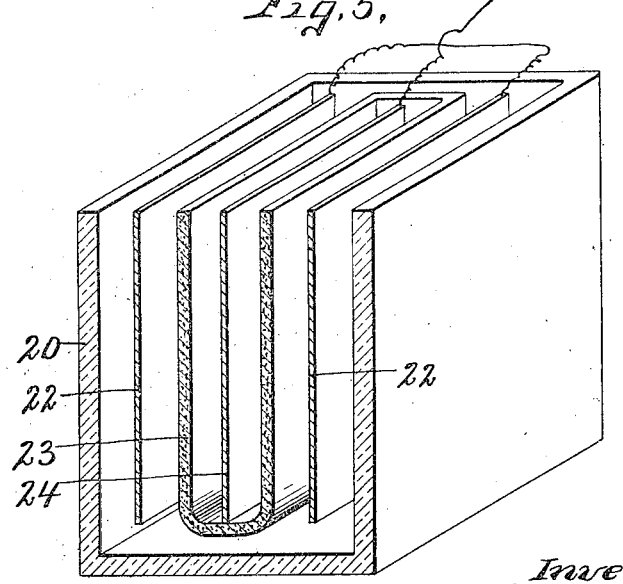

In the drawings—Figure 1 is a perspective view, partly in section, of a lixiviator and electrolytic apparatus for carrying out my process. Figs. 2 and 3 are perspective views of the detached electrode-trays. Fig. 4 is a perspective view of the supporting frame for said trays. Fig. 5 is a perspective view, partly in section of a modified form of the apparatus shown in Fig. 1. Figs. 6 and 7 are respectively a transverse sectional view and a top plan of further modified forms of my invention, and Fig. 8 is a perspective view of a portion of the support and one tier of trays therein as shown in Fig. 7.

In carrying out this process the copper-containing ore is placed upon one or more anodes —1— herein consisting of lead plates in the bottom of suitable supporting or confining trays —2— of wood or other suitable material, which latter are removably supported upon shelves —3— of an upright frame —4— also of wood or other suitable material. It is apparent that other electrodes may be used. This frame together with the trays and other elements carried thereby, is immersed in a suitable electrolyte hereinafter described, and which is contained in a cell —5— of porcelain, rubber or other acid resisting material.

Associated with each anode —1— is a superposed cathode —6— herein consisting of a horizontal lead plate, each pair of electrodes being spaced a sufficient distance apart one above the other to receive between them a porous cup or acid pervious partition —7— leaving ample intervening spaces below said partition for the reception of the copper-containing ore in the tray —2—, and also leaving a space above for the collection of the liberated copper.

Each porous partition —7— is preferably made in the form of a tray or cup removably supported upon the underlying tray —2— and consisting herein of an apertured frame of wood or other suitable substance supporting in its apertures an earthen ware porous plate.

The anodes —1— are electrically connected to a conductor —8—, while the cathodes —6— are electrically connected to a similar conductor —9—, these conductors being adapted to be connected to any suitable source of electric energy.

The electrolyte which is placed in the cell —5— consists of chromic acid mixed with a suitable quantity of dilute sulfuric acid, which dissolves the copper and forms sulfate of copper and sulfate of chromium. In the chemical reaction of the chromium solution by an electric current, the copper-containing solution is reduced at the cathode in the liberation of copper and chromic acid is formed at the anode for dissolving the copper.

In operation, when the copper-containing ore is placed in the anode-trays —1— and capped by the cathode tray or cup —6— within an electrolyte composed of chromic and dilute sulfuric acids and the electrodes connected to a source of electric energy chromic acid is formed and, the copper of the ore is dissolved at the anode and metallic copper is liberated at the cathode.

When the ore at the anode is deprived of its copper by dissolution, it is removed and fresh ore is supplied, this operation being repeated until a sufficient quantity of the liberated copper has been collected.

It is obvious from the foregoing description that the copper is rapidly dissolved through the medium of the chromic acid formed at the anode and is dispersed through the liquid to the cathode where the copper is liberated, the chromic acid acting as the solvent while the electric current through the medium of the electrodes serves to separate and collect the copper from the solution.

The device shown in Fig. 5 is a simple apparatus for liberating the copper from the solution, and simultaneously regenerating the exhausted chromic acid, and comprises a cell —20— for the electrolyte in which is immersed suitable cathodes —22— and a porous cup —23— containing an anode —24—. When the electrodes —22— and —24— are connected to a source of electric energy, copper is liberated at the cathode —22— and chromic acid is generated at the anode —24—. This apparatus may be used in the following manner: A solution of chromic acid and sulfuric acid is first used to dissolve the copper in the ore body; the copper-containing solution is then placed in the compartment containing the cathode —22— and subjected to the action of an electric current thereby liberating the copper and leaving chromium sulfate. The chromium sulfate is then placed into the anode compartment or cup —23— and by the medium of the electric current chromic acid is regenerated, advantage being taken to always have the copper containing solution in the cathode compartment and the chromium sulfate solution in the anode compartment, in which event the copper is liberated and chromic acid is regenerated in one operation. The general process, however, consists substantially in subjecting the copper ore to the action of the chromic acid solution whereby the copper is dissolved, and finally liberating the dissolved copper by the action of an electric current through the medium of suitable electrodes.

In Fig. 6 I have shown a top plan of a modified form of my invention consisting of a cell —30— containing a suitable electrolyte in which is immersed suitable porous cups —31— of earthenware or similar porous material and a frame —32— of wood or equivalent insulating material, the cup —31— containing electrodes —33— for the deposition of copper thereon while the frame —32— receives and supports a series of trays containing electrodes —34— of lead or other suitable metal. In this device the ore is placed within the trays and in the reaction, copper is liberated within the porous cups —31— at the electrodes —33— while the metal within the ore is dissolved in the tray electrodes —34—. By this arrangement the ore within the trays is more evenly abstracted and produces a correspondingly more effective liberation of the metal.

In Figs. 7 and 8, I have shown a cell —40— containing an electrolyte in which is immersed suitable electrodes —41— of lead or other material adapted to receive the copper deposit and also containing frames —42— of wood or other insulating material in which is supported a series of trays —43— having electrodes —44— of lead or other suitable material and transverse partitions —45— of the same material. These electrodes —44— are electrically connected to a conductor —46— while the electrodes —41— are similarly connected to a conductor —47— both of said conductors being connected to a suitable source of electric energy as a battery —49—. The object of this arrangement is to more easily handle large quantities of ore and to cut down the internal electrical resistance of the cells.

What I claim is:—

1. The herein described process of separating copper from its ores consisting in subjecting the copper containing ore to the action of a chromic acid solution.

2. The herein described process of separating copper from its ores consisting in subjecting the copper containing ore to the action of a solution of sulfuric acid and chromic acid.

3. In a process for depositing copper, subjecting the copper containing body to the action of a chromic acid solution and passing a suitable electric current through the resulting solution.

4. The herein described process of separating copper from its ores consisting in placing the copper containing ore in one of two compartments divided by a porous partition, subjecting such ore to the action of chromic acid and immersing in the compartments separate electrodes one of which is in contact with the copper whereby the copper in contact with its electrode is dissolved.

5. In a process for depositing copper, subjecting a copper containing body to the action of an electrolyte containing a chromium compound and passing a suitable electric current through the electrolyte.

In witness whereof I have hereunto set my hand this 14th day of August 1907.

HENRY K. HESS.

Witnesses:
M. M. NOTT,
H. E. CHASE,
HOWARD P. DENISON.